United States Patent [19]
Swanquist

[11] 3,788,582
[45] Jan. 29, 1974

[54] CONNECTOR FOR NON-METALLIC SHEATHED CABLE

[75] Inventor: Wesley W. Swanquist, South Bend, Ind.

[73] Assignee: All-Steel Inc.

[22] Filed: Mar. 22, 1973

[21] Appl. No.: 343,905

[52] U.S. Cl.............. 248/56, 174/65 R, 174/153 G, 285/159, 285/162
[51] Int. Cl................................................. F16l 5/00
[58] Field of Search............174/65 R, 65 G, 153 G; 248/56; 285/158, 159, 162, 194, 195, 207, 208

[56] References Cited
UNITED STATES PATENTS

| | | | |
|---|---|---|---|
| 2,490,286 | 12/1949 | Tornblom | 285/159 |
| 2,945,085 | 7/1960 | Billups | 174/153 G |
| 3,174,776 | 3/1965 | Berger | 285/162 |
| 3,493,205 | 2/1970 | Bromberg | 248/56 |

Primary Examiner—Laramie E. Askin
Attorney, Agent, or Firm—Robert C. Brown, Jr. et al.

[57] ABSTRACT

A connector for connecting non-metallic sheathed cable to electrical boxes in which the connector is an all plastic, screwless device, in the form of a tubular plastic body having a cross bore in the end of same that is to protrude from the box in which is journaled a rotary cam member that is shaped to permit ready application of the cable to the connector body in one position of the cam member relative to the body, and to indent the cable into an opposing recess formed in the connector body, in the inverted position of the rotary cam member, with the body being bisected extending from the other or mounting end of the same up to the cross bore for contraction purposes to permit application of the body mounted end into the box knock-out opening, and with the action of the cam member in indenting the cable being effective to expand the body mounting end to anchor same to the box.

8 Claims, 11 Drawing Figures

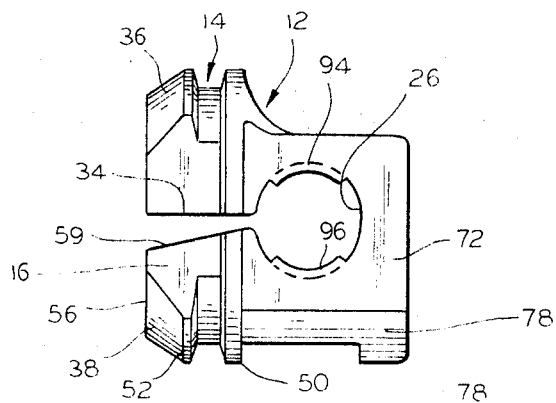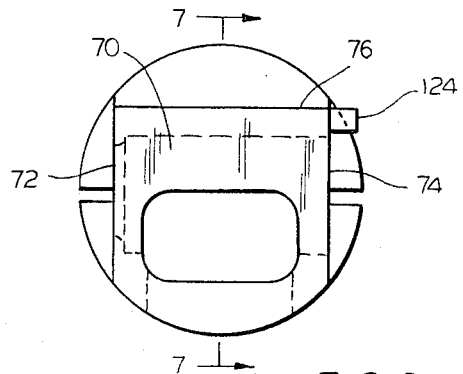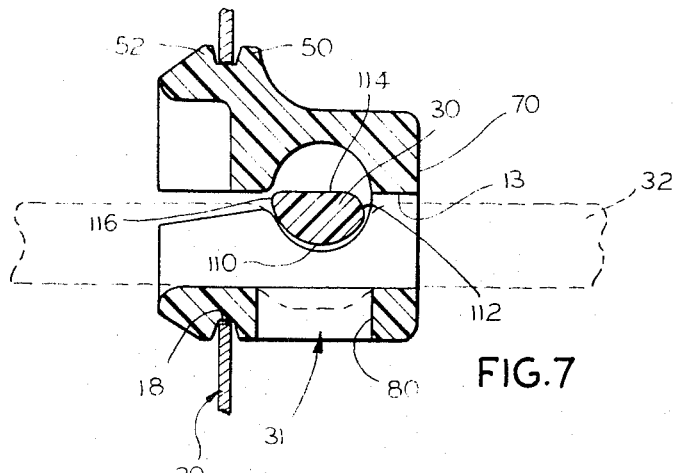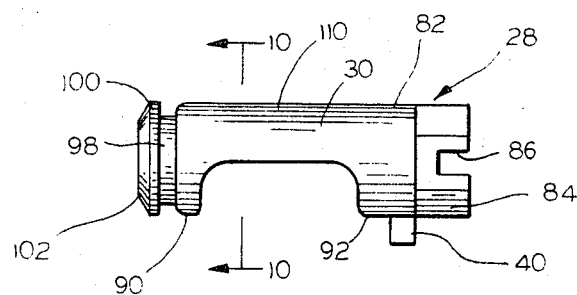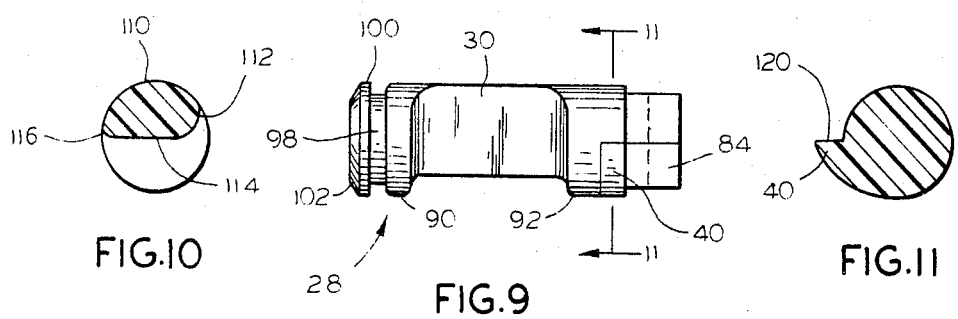

CONNECTOR FOR NON-METALLIC SHEATHED CABLE

This invention relates to a connector for connecting nonmetallic sheathed cable to electrical boxes, and more specifically, to a connector for securing such cable in knock-out openings of conventional electrical boxes.

Connectors of the prior art have been arranged to avoid the conventional lock nut securement of the connector to the box by forming the connector mounting end to be expandable using a screw to provide the needed pressure. Examples are shown in Berger U.S. Pat. No. 3,174,776 and Bromberg U.S. Pat. No. 3,556,566. However, these devices are designed for use in connection with metallic electrical tubing, and would not be suitable for use with non-metallic sheathed cable as the screw of these conventional devices must bear against the tubing that receives the electrical wires.

The principal object of this invention is to provide an expanding type electrical connector that is especially suited for non-metallic sheathed cable without risking damage to the cable sheathing.

Another principal object of the invention is to provide a connector for non-metallic sheathed cable that eliminates the conventional expanding screw, and that may be of all plastic construction.

Other objects of the invention are to provide a connector for non-metallic sheathed cable in which a screwless rotary cam member is pivoted by the electrician approximately 180° to a cable indenting position for both anchoring the connector to the box and making the cable fast to the connector, and in which the connector provides a stop for the rotary cam that stops movement of the rotary cam member automatically at the desired cable indenting position.

Further objects of the invention are to provide a connector for non-metallic sheathed cable that is economical of manufacture, convenient to install, and long lived in use.

In accordance with this invention, the connector comprises a tubular all plastic body having a cross bore formed in the end of the same that is to protrude from the box, and in which is journaled a rotary cam member that is shaped for ready application of the cable to the connector body in one position of the cam member, and to indent the cable into a recess formed in the body in opposed relation to the cam member, in the inverted position of the cam member. The connector body is bisected, extendng from the other or mounting end of same up to the cross bore, for contraction purposes to permit ready application of the connector body mounting end into the box knock-out opening. The arrangement is such that the action of the cam member indenting the cable is also operated to expand the connector body mounting end to anchor same to the box.

Other objects, uses, and advantages, will be obvious or become apparent from a consideration of the following detailed description and the application drawings.

In the drawings:

FIG. 5 is an elevational view of the connector body taken from the side opposite that shown in FIG. 2, and with the rotary cam member omitted;

FIG. 6 is an end view of the connector body taken from the right hand end of FIG. 5;

FIG. 7 is a sectional view through the connector body, taken substantially along line 7—7 of FIG. 6, and showing the cam member applied to the connector body, and the connector in operative relation to the cable end and the electrical box of FIG. 1;

FIG. 8 is an elevational view of the rotary cam member showing same as positioned relative to the connector body bore to freely accommodate application of the cable to the connector body (the position of FIGS. 2 – 4);

FIG. 9 is a view similar to that of FIG. 8, but showing the rotary cam member rotated 90 degrees form the position of FIG. 8, in the direction of the observer (or clockwise of FIG. 2);

FIG. 10 is a sectional view taken substantially along line 10—10 of FIG. 8; and

FIG. 11 is a sectional view taken substantially along line 11—11 of FIG. 9.

However, it is to be distinctly understood that the specific drawing illustrations provided are supplied primarily to comply with the requirements of the Patent Laws, and that the invention may have other embodiments that will be obvious to those skilled in the art, and which are intended to be covered by the appended claims.

GENERAL DESCRIPTION

Figure 1:
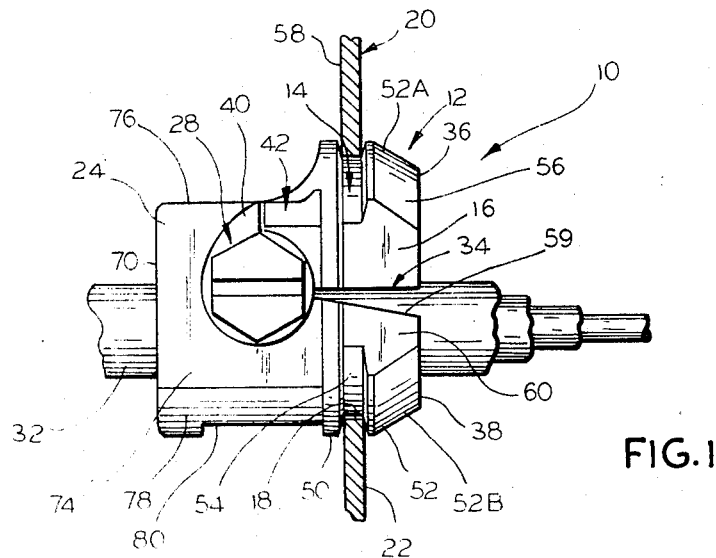
FIG. 1 is a side elevational view of one embodiment of the invention shown applied to a non-metallic sheathed cable and secured to an electrical box knock-out opening, in accordance with this invention, with the box wall being shown in section.

Reference numeral 10 of FIG. 1 generally indicates a preferred embodiment of the invention which generally comprises a tubular connector body 12 defining a main bore or passage 13 and a seat 14 at its mounting end 16 that is adapted to be applied to a knock-out opening 18 of an electrical box 20 (a wall 22 of which has the knock-out opening 18 formed therein in the usual manner).

Figures 2, 3:
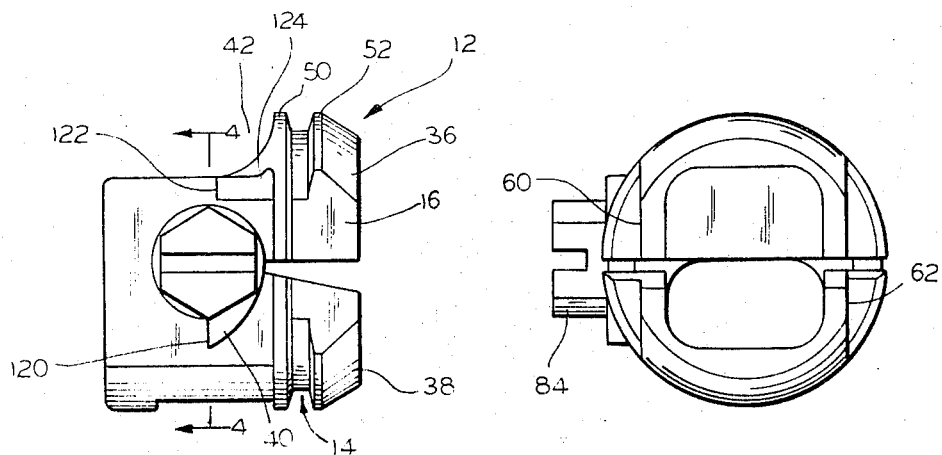
FIG. 2 shows the device that is viewed in FIG. 1, but prior to application of the cable into the box.
FIG. 3 is an end elevational view of the connector as viewed from the right hand end of FIG. 2.
Figure 4:
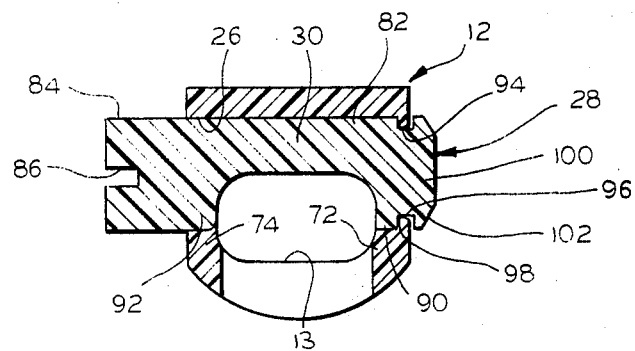
FIG. 4 is a fragmental sectional view taken substantially along line 4—4 of FIG. 2.

The connector body 12 between the seat 14 and its other end 24 is formed with a cross bore 26 in which is journaled a rotary cam member 28 that includes a camming portion 30 that is proportioned so that when the cam member 28 is in the position of FIGS. 2 – 4, a non-metallic sheathed cable 32 may be readily applied through connector body 12, and specifically, its main bore 13.

Body 12 has its end 16 segmented, as by being bisected as at 34, in such a manner that the resulting end segments 36 and 38 may be brought together to contract body end 16 radially of the connector body for inserting the connector body end 16 within the knock-out opening 18. The bisecting extends longitudinally or axially of the body 12 to the cross bore 26 (see FIG. 5).

The cam member 28 is formed with a stop lug 40 cooperating with a stop arm 42 of the connector body, whereby when the cable 32 is applied to the connector body, with the cam member in the position of FIGS. 2

— 4, and the connector body 12 has its end 16 applied to the box knock-out opening 18, on rotating the cam member 28 from the position of FIG. 2 to the position of FIG. 1, wherein the stop lug 40 engages the stop arm 42, the cable 32 is indented into the connector body recess 31 by the engagement therewith of the camming member cam portion 30, and the action of this indenting function of the connector body spreads the body segments 36 and 38 to firmly seat the portion of the box wall 22 that defines the knock-out opening 18 in the body seat 14. The connector 10 can be applied to the box either before or after the cable is applied to the connector, though as a matter of convenience, application of the empty connector to the box is preferred.

Connector body 12 and cam member 28 are preferably formed from a suitable electrically insulating plastic material such as ABS (acrylonitrile-butadiene-styrene), or the modified phenylene oxide that is sold under the trademark NORYL (by General Electric Co.). However, any suitable plastic material may be used, and furthermore the connector is readily adapted to be made from suitable metallic materials such as die cast zinc or aluminum, ferrous castings, or non-ferrous metals.

It is to be noted that only a 180° rotary action of the cam member is required to both secure the cable to the connector by indenting same into recess 31, and anchor the connector to the box wall 22 (this being achieved by the spreading action of the body segments 36 and 38 that results as a reaction of the rotary cam member 28 acting on the cable).

SPECIFIC DESCRIPTION

The bore 13 of body 12 preferably has the generally quadrilateral transverse cross-sectional configuration that is indicated in FIGS. 3, 4 and 6 to accommodate the familiar non-metallic sheathed cable 32. It is to be noted that the long dimension of the transverse section of bore 13 extends parallel to rotary cam member 28.

The connector body end 16 defines a pair of spaced apart radial flanges or ribs 50 and 52 on either side of the recess 54 which define the connector body seat 14. The flange or rib 52 is shaped to define conical surface 56 that serves as a cam to contract the connector body end on its being inserted into the knock-out opening 18 from the outside surface 58 of the box wall 22. Body segment 38 is angled as at 59 to insure sufficient contraction of body end 16 when being inserted into opening 18.

In the form shown, the connector body end 16 is formed with opposed planar surfaces 60 and 62 on either side of same to insure clearance when the body segments are contracted in being inserted into the knock-out opening. The surfaces 60 and 62 thus define the flange rib 52 into flange or rib sections 52A and 52B.

The connector body 12 at its end 24 defines a planar end wall 70, planar side walls 72 and 74, and planar top wall 76, with the cross bore 26 being formed in said walls 72 and 74. The side walls 72 and 74 merge into a lower arcuate wall 78 that is struck about the longitudinal axis of the body 12, and which is formed with a window opening 80 of generally quadrilateral configuration that defines the recess 31. The generally quadrilaterial shape of body end 24 is in line with the generally quadrilateral transverse cross-sectional shape of cable 32.

The body walls 70, 72 and 74 thus connect body segments 36 and 38 together, and as the body is made from a resiliently flexible material segments 36 tend to return to their relative positions of FIG. 5 after being contracted together and then released.

The cam member 28 is in the form of a spindle 82 shaped at its mid portion to define the camming portion 30 and including a hex shaped head 84 that is suitably slotted as at 86 for application of a screw driver blade.

The camming portion 30 of the rotary cam member includes cylindrical shoulders 90 and 92 which are journaled in the respective connector body walls 72 and 74 to journal member 28 in cross bore 26. The connector body wall 72 is formed with a pair of spaced apart flange segments 94 and 96 (see FIGS. 4 and 5) that seat with a snap fit into circumferential recess 98 that is formed in the shank end 100 of the cam member 28. The end 100 is formed with a conical cam surface 102 to aid in seating the flange portions 94 and 96 in the recess 98, as by inserting the cam member end 100 into the cross bar bore 26 through the body wall 74 and into the body wall 72 whereby the cam member may be pressed against the flange portions 94 and 96 to snap the latter into the recess 98 for journaling cam member 28 in its operative position within the connector body.

The cam member cam portion 30 between its cylindrical shoulders 90 and 92 defines cam surface portion 110 that has the same radius as shoulders 90 and 92, and which merges at rounded corner 112 into planar surface 114 that extends transversely of the cam member and in substantial alignment with the longitudinal axis of same, and which merges at curved corner 116 into the surface 110. It is to be noted that the corner 112 is arced about a radius that is considerably larger than the radius of the corner 116, and this is for the purpose of easing the cam surface 110 into indenting relation with the cable 32 as the cam member is turned from the position of FIG. 2 to the position of FIG. 1.

The stop lug 40 has the general configuration shown in FIG. 11, including planar stop surface 120 that engages the planar stop surface 122 of stop arm 42, with the latter being in the form of protuberance 124 extending outwardly of the body side wall 74 adjacent and integrally united with the flange 50.

The box 20 (only the wall 22 of which is shown) may be any conventional electrical box, such as the familiar outlet and switch boxes.

It will thus be seen that there has been provided a two part all-plastic connector assembly which is free of screws or screw threading of the type customarily associated with expanding type connectors.

The rotary cam member is readily applied to the cam body by being inserted through the opening in the body wall 72 in the manner that has been indicated, and when the rotary cam member is in the position of FIG. 2, its cam portion 30 is positioned as shown in FIGS. 3 and 4 to readily accommodate application of a cable 32 thereto.

In such condition, the electrician can press the connector body end 16 into the knock-out opening, from the outside of the box, with the body segments 36 and 38 contracting under the camming action of surface 56 for smooth entry into the knock-out opening, and then snapping back to the relative position of FIG. 5 to loosely hold the connector within the knock-out opening.

The electrician then can readily insert the cable 32 through the bore 13 of the body to give the desired amount of cable length within the box 20, after which it is merely necessary to rotate the cam member 180 degrees from the position of FIG. 2 to the position of FIG. 1 to both secure the cable to the connector and anchor the connector body to the box by expanding body segments 36 and 38 against the edge of the knock-out opening.

While the connector or fitting of this invention is intended for use in connection with the familiar knock-out openings of conventional boxes, the connector is also readily adapted for use in connection with box or other openings of standard knock-out size that are punched or drilled, whether in the field or otherwise. Of course, the fitting of this invention can be proportioned for use in connection with any size knock-out or otherwise formed box wire receiving opening.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A connector for connecting non-metallic sheathed cable to electrical boxes, said connector comprising:
   a tubular body formed to define a passage therethrough extending axially thereof to receive the cable,
   a cam member journaled in said body cross-wise of said passage and having a cam portion shaped to accommodate application of a cable end through said body in one position of same relative to said body and to indent the cable laterally of said bore in a second position of same relative to said body,
   said body being formed with a recess opposing said cam member into which the cable is indented by said cam member in said second position thereof,
   said body having one end of same contractable for reception of same in a knock-out opening of a wall of the box,
   with said body one end defining a seat adapted to receive the margin of the box wall defining the knock-out opening,
   said cam member cooperating with said body to expand said body one end to seat the box wall margin in said body seat on movement thereof from said one position to said second position.

2. A connector for connecting non-metallic sheathed cable to electrical boxes, said connector comprising:
   a tubular body formed to define a passage therethrough extending axially thereof to receive the cable,
   a cam member journaled in said body cross-wise of said passage and having a cam portion shaped to accommodate application of a cable end through said body in one position of same relative to said body and to indent the cable laterally of said bore in an inverted position of same relative to said body,
   said body being formed with a recess opposing said cam member into which the cable is indented by said cam member in said inverted position thereof,
   said body being segmented axially thereof at one end thereof for contraction radially of the body axis for reception of same in a knock-out opening of the box wall,
   said body one end being formed exteriorly thereof with a circumferential indentation adapted to receive the margin of the box wall that defines the knock-out opening,
   said cam member cooperating with said body to radially expand the body segments at said body one end to seat the box wall margin in said indentation on movement of said cam member from said one position to said inverted position.

3. The connector set forth in claim 2 wherein:
   said body and cam member are formed from non-metallic material.

4. The connector set forth in claim 2 wherein:
   said body member is formed with a cross bore adjacent the other end of said body,
   with said cam member being journaled in said cross bore,
   and with said body segmentation extending to said cross bore whereby the action of said cam member of indenting the cable effects said expansion of said body member one end.

5. The connector set forth in claim 4 wherein:
   said body other end is of quadrilateral transverse cross-sectional configuration with said cross bore being formed in two opposed walls thereof, 6. The connector set forth in claim 5 wherein:
   said body segmentation is defined by said body being substantially bisected longitudinally thereof.

7. The connector set forth in claim 2 wherein:
   said recess comprises a window opening formed in said body and having a quadrilateral configuration of which two opposed sides extend parallelly of said body.

8. The connector set forth in claim 2 wherein:
   said cam member and said body are formed with cooperating stops that engage when said cam member is in its said inverted position.

* * * * *